United States Patent [19]

Verbaas

[11] 4,025,727
[45] May 24, 1977

[54] BALANCED TONE APPLICATION SYSTEM

[75] Inventor: George Verbaas, Brockville, Canada

[73] Assignee: GTE Automatic Electric (Canada) Limited, Brockville, Canada

[22] Filed: July 6, 1976

[21] Appl. No.: 702,568

[52] U.S. Cl. .......................... 179/18 HB; 179/18 F; 179/84 R

[51] Int. Cl.² ......................................... H04M 3/04

[58] Field of Search ............ 179/84 T, 84 R, 84 A, 179/84 VF, 18 HB, 18 F, 18 FA

[56] References Cited

UNITED STATES PATENTS

| | | | |
|---|---|---|---|
| 3,651,271 | 3/1972 | Knauer | 179/18 HB |
| 3,764,753 | 10/1973 | Wisotzky | 179/84 VF |

*Primary Examiner*—Thomas A. Robinson
*Attorney, Agent, or Firm*—David W. Heid

[57] ABSTRACT

The disclosure relates to a balanced tone application system for applying dial tones, busy tones, or the like generated by a tone generator, to telephone transmission line pairs in a balanced manner and for use in a telephone exchange of the type having a supervisory relay coupled across an associated transmission line pair. The system comprises a transformer having a primary coupled to the tone generator and a secondary including first and second windings, a power source coupled to the first winding, a source of common potential coupled to the second winding, and a switching means coupled to the first winding, the second winding, the power source, the source of common potential, and to the supervisory relay. The switching means is switchable between first and second states for connecting the supervisory relay only to the power source and to the source of common potential when in the first state to thereby apply only energizing power to the supervisory relay and to the transmission line pair, and for connecting the supervisory relay to the power source, to the source of common potential, and to the first and second windings when in the second state to thereby apply both energizing power and the tone generated by the tone generator through the first and second windings to the supervisory relay and to the transmission line pair.

7 Claims, 1 Drawing Figure

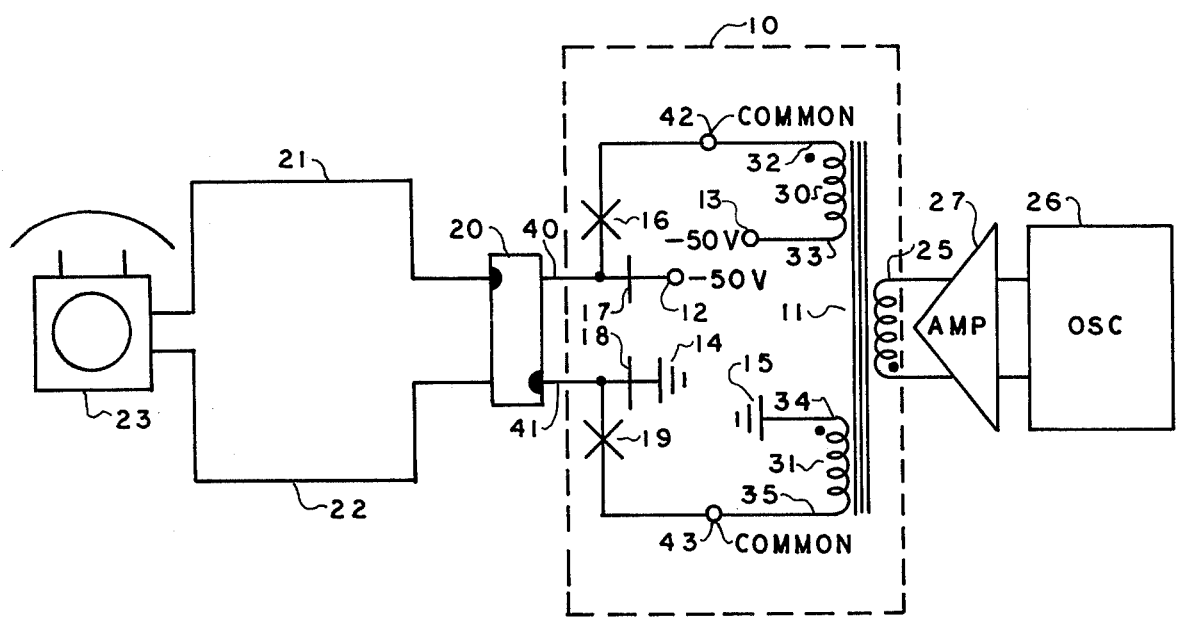

BALANCED TONE APPLICATION SYSTEM

BACKGROUND OF THE INVENTION

The present invention is generally directed to a balanced tone application system and in particular to a balanced tone application system for use in a telephone exchange for applying signal tones to transmission line pairs in a balanced manner.

In order to provide service to telephone subscribers it is necessary to apply signal tones to the transmission line pairs coupled to the subscriber receivers. Such tones include dial tones, busy tones, or the like.

Because transmission line pairs are usually grouped immediately adjacent to one another to form rather large cables, when tones, which are AC voltages, are applied to transmission line pairs in an unbalanced manner, crosstalk to other adjacent transmission line pairs occurs. Applying tones in an unbalanced manner requires the tone to be coupled to one side of the line pair while it is returned to ground on the other side of the line pair. The crosstalk which occurs between adjacent transmission line pairs when tones are applied in an unbalanced manner has a serious effect on telephone communication.

To overcome the problems which ensue in supplying tones to transmission line pairs in an unbalanced manner, tones have been applied in a balanced manner wherein an equal amount of tone power is applied to both sides of the line. This avoids crosstalk to adjacent pairs in a cable.

In the past tones have been coupled to telephone lines in a balanced manner by using a floating tone generator which is transformer coupled to the transmission line pairs. Because a single tone generator is utilized by many transmission line pairs, isolation must be provided within each line of the transmission line pairs. The necessary isolation has been provided by using a pair of resisters, a pair of capacitors, and a pair to make contacts. While the prior art methods have been technically satisfactory, they have been expensive. The required capacitors are in themselves quite expensive and also occupy a disproportionate amount of space on the printed wiring boards as compared to the printed board space occupied by other components. Thus, not only is the prior art method expensive but it is also cumbersome to use in commercial applications.

It is therefore a general object of the present invention to provide a new and improved balanced tone application system for a telephone exchange.

It is a more particular object of the present invention to provide a balanced tone application system for use in a telephone exchange which does not require expensive and bulky capacitors and resistors for isolation.

SUMMARY OF THE INVENTION

The invention provides a balanced tone application system for applying dial tones, busy tones, or the like generated by a tone generator, to telephone transmission line paris in a balanced manner and for use in a telephone exchange of the type having a supervisory relay coupled across each transmission pair. The system comprises a transformer having a primary coupled to the tone generator and a secondary including first and second windings, a power source coupled to the first winding, a source of common potential coupled to the second winding, and switching means coupled to the first winding, the second winding, the power source, the source of common potential and to a supervisory relay, and switchable between first and second states. When the switching means is in the first state, the supervisory relay is only connected to the power source and the source of common potential to thereby apply only energizing power to the supervisory relay and to the transmission line pair associated with the supervisory relay and when the switching means is in the second state, the supervisory relay is connected to the power sorce, to the source of common potential, and to the first and second windings to thereby apply both energizing power and the tone generated by the tone generator through the first and second windings to the supervisory relay and to the transmission line pair associated with the supervisory relay. As a result, the supervisory relay isolates its associated transmission line pair from the other transmission line pairs.

BRIEF DESCRIPTION OF THE DRAWING

The features of the present invention which are believed to be novel are set forth with particularity in the appended claims. The invention, together with further objects and advantages thereof, may best be understood by reference to the following description taken in conjunction with the accompanying drawing, in which the single FIGURE is a schematic circuit diagram, partially in block form, of a balanced tone application system in accordance with the present invention.

DESCRIPTION OF THE PREFERRED EMBODIMENT

Referring now to the sole FIGURE, the balanced tone application system 10 there shown comprises transformer 11, a −50 volt power source at terminal 12 and 13, a source of common potential at 14 and 15, and switching means comprising a relay having contacts 16, 17, 18 and 19. Also shown in the sole FIGURE is a supervisory relay 20 having an associated transmission line pair including lines 21 and 22 coupled across it. Lines 21 and 22 are coupled to a suitable telephone subscriber receiver 23 of the type well known in the art. Each subscriber has an assigned transmission line pair and an associated supervisory relay 20 located within the subscriber's telephone exchange.

Transformer 11 has a primary 25 which is coupled to the tone generator or oscillator 26 by an amplifier 27. Oscillator 26 is of the type well known in the art for providing signal tones such as busy tones, dial tones, or the like.

Transformer 11 also includes a secondary comprising first winding 30 and second winding 31. First winding 30 has a first end 32 and a second end 33. Second winding 31 has a first end 34 and a second end 35.

The switching means includes a first make contact 16, a first break contact 17, a second make contact 19, and a second break contact 18. The switching means or relay is shown in a well known manner referred to as "detached contact" notation in which an X shown intersecting a conductor represents a normally open contact (make contact) and a bar shown intercepting a conductor represents a normally closed contact (break contact), "normally" referring to the unoperated condition of the relay. This type of notation is well known in the art and the principles of this type of notation are described in an article entitled "An Improved Detached Contact Type Schematic Circuit Drawing" by F. T. Meyer in the September, 1955 publication of the *American Institute of Electrical Engineers Transactions*,

*Communications and Electronics*, Vol. 74, pages 505–513.

Each of the make and break contacts includes a first and second side. The first sides of the first make contact 16 and first break contact 17 are coupled together and are also coupled to one side 40 of supervisory relay 20. The first sides of the second make contact 19 and second break contact 18 are coupled together and are also coupled to the other side 41 of supervisory relay 20. The second side of the first make contact 16 is coupled to the first end 32 of the first winding 30. The second side of the first break contact 17 is coupled to the −50 volt power source at terminal 12. The second side of the second make contact 19 is coupled to the second end 35 of the second winding 31. The second side of the second break contact 18 is coupled to ground reference potential as shown at 14. The second end 33 of the first winding 30 is coupled to the −50 volt power source at terminal 13 and the first end 34 of winding 31 is coupled to the ground reference potential as shown at 15.

Supervisory relay 20 is of the type well known in the art wherein, when it is energized, it provides energizing power to the transmission line pair 21 and 22 for providing power to the subscriber telephone instrument 23. Common terminals 42 and 43 are shown connected to the first end 32 of first winding 30 and second end 35 of second winding 31 respectively, the common terminals indicating that other subscriber telephone instruments, transmission line pairs, supervisory relays, and switching means may be interconnected on the common terminals 42 and 43 in tandem. Thus, tone oscillator 26 and transformer 11 may serve more than one subscriber.

In operation, the switch means comprising contacts 16, 17, 18 and 19 is switchable between a first state and a second state. In the first state, make contacts 16 and 19 are open and break contacts 17 and 18 are closed. Thus, supervisory relay 20 is only coupled to the −50 volt power source at terminal 12 and to ground at 14 so that only energizing power is applied to supervisory relay 20 and the transmission line pair 21 and 22.

When a dial tone, busy tone, or the like is to be applied to the transmission line pair 21 and 22, the switch means assumes the second state wherein the make contacts 16 and 19 are closed and the break contacts 17 and 18 are open. Energizing power is still applied to the supervisory relay 20 and transmission line pair 21 and 22 because terminal 13 is coupled to the power source and first end 34 of winding 31 is coupled to ground. Thus, energizing power is applied to the supervisory relay 20 and the transmission line pair 21 and 22 through the first and second windings 30 and 31 respectively. Also, the tone generated by oscillator 26 is applied through the first and second windings 30 and 31 to the supervisory relay 20 and the transmission line pair 21 and 22. Preferably, windings 30 and 31 comprise the same number of turns wound in opposition as indicated by the dotted nomenclature to assure that an equal amount of tone power but of opposite polarity are applied to each of the transmission lines.

In actual practice it can be expected that more than one transmission line pair will be receiving a tone at any given time. However, no transmission line pair will interfere with another because each is isolated from the other transmission line pairs by its associated supervisory relay. Specifically, transmission line pair 21, 22 is isolated from all other line pairs by its associated supervisory relay 20.

Also in its preferred form, the relay comprising contacts 16, 17 18 and 19 is configured so that make contacts 16 and 19 close before break contact 17 nd 18 open. This assures that supervisory relay 20 and the transmission line pair will have a continuous source of energizing power.

The present invention therefore provides a new and improved balanced tone application system. The present invention negates the need for isolating capacitors and resistors and provides isolation by means of the supervisory relay associated with each transmission line pair. Thus, each transmission line pair is isolated from all other transmission line pairs. The system of the present invention is less expensive to implement commercially and less cumbersome.

While a particular embodiment of the invention has been shown and described, modifications may be made, and it is intended in the appended claims to cover all such modifications which fall within the true spirit and scope of the invention.

What is claimed is:

1. A balanced tone application system for applying dial tones, busy tones, or the like generated by a tone generator, to telephone transmission line pairs in a balanced manner and for use in a telephone exchange of the type having a supervisory relay coupled across each transmission line pair, said system comprising:
  a transformer having a primary coupled to the tone generator and a secondary including first and second windings;
  a power source coupled to said first winding;
  a source of common potential coupled to said second winding; and
  switching means coupled to said first winding, said second winding, said power source, said source of common potential, and to a supervisory relay, and said switching means being capable of assuming first and second states for connecting the supervisory relay only to said power source and to said source of common potential when in said first state to thereby apply only energizing power to the supervisory relay and to the transmission line pair associated with the supervisory relay, and for connecting the supervisory relay to said power source, to said source of common potential, and to said first and second windings when in said second state to thereby apply both energizing power and the tone generated by the tone generator through said first and second windings to the supervisory relay and to the transmission line pair associated with the supervisory relay, whereby the supervisory relay isolates its associated transmission line pair from all other transmission line pairs.

2. A system in accordance with claim 1 wherein said switching means comprises a relay having first and second pairs of contacts, said first pair of contacts including a first make contact and a first break contact, and said second pair of contacts including a second make contact and a second break contact, each of said make and break contacts having first and second sides, said first sides of said first make and break contacts being coupled together and to one side of the supervisory relay, said first sides of said second make and break contacts being coupled together and to the other side of the supervisory relay, said second side of said first break contact being coupled to said power source, said second side of said second break contact being coupled to said source of common potential, said second side of said first make contact being coupled to said first winding and said second side of said second make contact being coupled to said second winding.

3. A system in accordance with claim 2 wherein said first and second windings include first and second ends, said first end of said first winding being coupled to said second side of said first make contact, said second end of said first winding being coupled to said power source, said first end of said second winding being coupled to said source of common potential, and said second end of said second winding being coupled to said second side of said second make contacts.

4. A system in accordance with claim 3 wherein said source of common potential is ground.

5. A system in accordance with claim 3 wherein said first and second windings comprise an equal number of oppositely wound turns to thereby provide the transmission pair lines with tones of equal and opposite polarity energy.

6. A system in accordance with claim 3 wherein said relay includes means for closing said make contacts prior to the opening of said break contacts.

7. A balanced tone application system for applying dial tones, busy tones, or the like generated by a tone generator, in a balanced manner to telephone transmission line pairs and for use in a telephone exchange of the type having a supervisory relay, wherein one transmission line pair is coupled across the supervisory relay, said system comprising:
 a relay having first and second pairs of contacts, said first pair of contacts including a first make contact and a first break contact, and said second pair of contacts including a second make contact and a second break contact, each of said make and break contacts having first and second sides, said first sides of said first make and break contacts being coupled together and to one side of the supervisory relay and said first sides of said second make and break contacts being coupled together and to the other side of the supervisory relay;
 a power source coupled to said second side of said first break contact;
 a common potential coupled to said second side of said second break contact; and
 a transfomrer having a primary and a secondary, said secondary comprising first and second windings, one side of said first winding being coupled to said second side of said first make contact and the other side of said first winding being coupled to said power source, one side of said second winding being coupled to said second side of said second make contact and the other side of said second winding being coupled to said common potential, and said primary being coupled to the tone generator; whereby,
when a tone is not applied to the transmission line pair, said make contacts are open and said break contacts are closed to thereby connect said power source and said common potential across the supervisory relay to provide the supervisory relay and the one transmission line pair with energizing power, and when a tone is applied to the one transmission line pair, said make contacts are closed and said break contacts are open to thereby provide energizing power to the supervisory relay from said power source and said common potential through said first and second windings and to provide the tone generated by the tone generator to the one transmission line pair through said transformer and the supervisory relay, whereby the supervisory relay isolates the one transmission line pair from all other transmission line pairs.

* * * * *